United States Patent
Hildreth et al.

(10) Patent No.: US 11,731,088 B2
(45) Date of Patent: *Aug. 22, 2023

(54) BRINE MACHINE AND METHOD

(71) Applicant: Douglas Dynamics LLC, Milwaukee, WI (US)

(72) Inventors: Clay Houston Hildreth, Carmel, IN (US); Andrew John Humke, Dubuque, IA (US)

(73) Assignee: Douglas Dynamics LLC, Milwaukee, WI (US)

( * ) Notice: Subject to any disclaimer, the term of this patent is extended or adjusted under 35 U.S.C. 154(b) by 174 days.

This patent is subject to a terminal disclaimer.

(21) Appl. No.: 17/188,530

(22) Filed: Mar. 1, 2021

(65) Prior Publication Data

US 2021/0178343 A1 Jun. 17, 2021

Related U.S. Application Data

(63) Continuation of application No. 15/963,538, filed on Apr. 26, 2018, now Pat. No. 10,960,363.

(Continued)

(51) Int. Cl.
*B01F 21/00* (2022.01)
*C09K 3/18* (2006.01)
*B01F 35/75* (2022.01)

(52) U.S. Cl.
CPC ............. *B01F 21/15* (2022.01); *B01F 21/30* (2022.01); *B01F 35/754551* (2022.01); *C09K 3/185* (2013.01); *B01F 21/503* (2022.01)

(58) Field of Classification Search
CPC .. B01F 1/0016; B01F 1/0038; B01F 15/0289; B01F 2001/0088; C09K 3/185
See application file for complete search history.

(56) References Cited

U.S. PATENT DOCUMENTS

| | | | |
|---|---|---|---|
| 2,412,560 | A | 12/1946 | Bolton |
| 2,614,032 | A | 10/1952 | Eichstaedt |

(Continued)

FOREIGN PATENT DOCUMENTS

| | | |
|---|---|---|
| CH | 699420 B1 | 3/2010 |
| EP | 0925833 A1 | 6/1999 |

(Continued)

OTHER PUBLICATIONS

Henderson Products, Brochure hp-199_brinextreme_truck_fill_pro, Nov. 2017.

(Continued)

*Primary Examiner* — Timothy C Cleveland
(74) *Attorney, Agent, or Firm* — Wood Herron & Evans LLP

(57) ABSTRACT

A brine machine comprises a salt hopper, a source of water for wetting salt in the salt hopper, a brine hopper positioned in side-by-side relation relative to the salt hopper, a filter providing fluid communication between the salt hopper and the brine hopper, a generally horizontal auger positioned in a base of the salt hopper, and an upwardly directed lift auger having a first end in operable association with an end of the horizontal auger and a second discharge end positioned above a level of brine in the brine hopper. The augers convey solid material from the base of the salt hopper and discharge the material from the machine.

2 Claims, 12 Drawing Sheets

Related U.S. Application Data

(60) Provisional application No. 62/662,546, filed on Apr. 25, 2018.

(56) References Cited

U.S. PATENT DOCUMENTS

| | | | |
|---|---|---|---|
| 3,574,559 | A | 4/1971 | Kryzer et al. |
| 4,701,266 | A | 10/1987 | Janka et al. |
| 5,169,406 | A | 12/1992 | Tewari |
| 5,792,434 | A | 8/1998 | Ferlings et al. |
| 5,819,776 | A | 10/1998 | Kephart |
| 6,439,252 | B1 | 8/2002 | Kephart |
| 6,451,270 | B1 | 9/2002 | Killian et al. |
| 6,468,481 | B1 | 10/2002 | Anderson |
| 6,736,153 | B1 | 5/2004 | Kime |
| 6,783,684 | B2 | 8/2004 | Teel, Jr. |
| 7,186,390 | B1 | 3/2007 | Hellbusch et al. |
| 8,466,257 | B2 | 6/2013 | Young et al. |
| 8,529,845 | B2 | 9/2013 | Kois |
| 9,890,310 | B2 | 2/2018 | Hughes et al. |
| 10,960,363 | B2 * | 3/2021 | Hildreth .......... B01F 35/754551 |
| 2013/0099155 | A1 | 4/2013 | Nesheim et al. |
| 2014/0251177 | A1 | 9/2014 | Nesheim et al. |

FOREIGN PATENT DOCUMENTS

| | | |
|---|---|---|
| EP | 1334688 A2 | 8/2003 |
| WO | 201704054 A1 | 1/2017 |

OTHER PUBLICATIONS

Henderson Products, Brochure hp-198_brinextreme_pro, Nov. 2017.
Henderson Products, Brochure hp-197_mobile_brine_unit, Nov. 2017.
Henderson Products, Brochure hp-195_brinextreme_ultimate, Nov. 2017.
Dultmeier Sales Brochure, Brine Production System—Convert Rock Salt to Salt Brine _ Dultmeier Sales, undated.

* cited by examiner

BRINE OULET

BRINE OULET

BRINE OULET

BRINE MACHINE AND METHOD

RELATED APPLICATIONS

This application is a continuation of U.S. patent application Ser. No. 15/963,538 filed Apr. 26, 2018, which claims the priority benefit of U.S. Provisional Patent Application No. 62/662,546 filed Apr. 25, 2018, both of which are hereby incorporated by reference herein as if fully set forth in their entirety.

FIELD OF THE INVENTION

This invention relates generally to machines for making brine for use as a melting agent for managing snow and ice on roadways, parking lots, and sidewalks, and more particularly, to self-cleaning brine machines that can continuously making brine.

BACKGROUND OF THE INVENTION

Salt Brine is a common solution used as a melting agent in managing snow and ice on surfaces such as roadways, parking lots, and sidewalks. Salt brine is made by combining NaCl and H2O into a solution, typically 23.3% solution weight/weight, when used as a melting agent for snow and ice control.

When used on roadways the volume of product required can exceed over 1,000,000 gallons per season for a single user. The solution at 23.3% saturation contains 2.288 lbs. of salt per gallon of solution. In many areas the most cost effective source of NaCl available is mined rock salt. Mined rock salt may typically have 5% foreign material, i.e. material other than salt ("MOS"), such as sand, calcium sulfate, and shale, in addition to other debris from transportation in trucks such as corn, wheat, etc. With a production rate being 50 to 100 GPM for a typical brine machine, the foreign material build-up can be expected to be 5 to 12 lbs. of MOS per minute. The brine machine must therefore periodically be shut down so that the MOS can be cleaned out of the machine. This clean out can be labor intensive and difficult, is non-productive use of time of the operators, and results in downtime of the brine machine.

The process of making a salt brine solution is fairly simple in that all that is required is to suspend salt into water. This can be done by 2 primary methods: either by soaking the salt in water, or by eroding the salt away with water. Typically, the erosion method produces brine faster and at high concentrations.

As the salt goes into suspension the non-dissolvable materials remain behind inside of the brine machine or become suspended into the solution. These non-dissolvable materials may also bind up the salt so it does not go into solution, plugging up flow paths, etc. As foreign material accumulates typically the brine production process slows to a point where the machine must be shut down and the MOS removed, so that production may resume.

Removing the MOS as wetted material verses a slurry is ideal so that handling of this product is minimized.

It is desired to produce clean brine. With salt having non-dissolvable material taken into suspension during the brine production process, these solids create maintenance issues. Storage tanks have sediment build up on the bottom of the tanks, and application equipment uses flow meters, pumps, and spray nozzles that get damaged or suffer from premature wear due to abrasives in the solution. Therefore, filtration of the solution to reduce the contamination is desirable.

The objective is to make clean brine rapidly at a desired concentration without the need to periodically shut the system down to clean it, thereby having the system continuously operating at peak performance.

SUMMARY OF THE INVENTION

The objective is attained by providing a brine machine that is continuously self-cleaning and thus continuously operational.

In one aspect, a brine machine comprises a salt hopper, a source of water for wetting salt in the salt hopper, a brine hopper positioned in side-by-side relation relative to the salt hopper, a filter providing fluid communication between the salt hopper and the brine hopper, a generally horizontal auger positioned in a base of the salt hopper, and an upwardly directed lift auger having a first end in operable association with an end of the horizontal auger and a second discharge end positioned above a level of brine in the brine hopper. The augers convey solid material from the base of the salt hopper and discharge the material from the machine.

The filter can be a multi-stage filter, for example a three-stage filter. The three-stage filter can comprise a first filter element having a first set of openings therein, a second filter element, spaced horizontally from the first filter element, and having a second set of openings therein, and a third filter element, spaced horizontally from the second filter element, and having a third set of openings therein. The openings of the first set of openings are larger than the openings of the second set of openings, and the openings of the second set of openings are larger than the openings of the third set of openings. Thus, unfiltered brine in the salt hopper passes through the first filter element, then the second filter element, and then the third filter element to enter the brine hopper as filtered brine. The first, second, and third filter elements are configured such that material collected on their respective filter surfaces falls downwardly toward the base of the salt hopper.

The brine machine can have a first water spray bar in the salt hopper positioned adjacent an inlet side of the filter for flushing the inlet side of the filter. The brine machine can have a second water spray bar in the brine hopper positioned adjacent an outlet side of the filter for flushing the outlet side of said filter. The second water spray bar can be rotatable. The brine machine can have a damper positioned in the salt hopper above the horizontal auger for selectively metering material from the salt hopper to the horizontal auger. The brine machine can have a third water spray bar in the salt hopper positioned above the damper for dissolving undissolved salt and sweeping material into the damper. The third water spray bar can be rotatable. The brine machine can have a grate positioned above the damper and below the third water spray bar.

In another aspect, a brine machine comprises a salt hopper, a source of water for wetting salt in the salt hopper, a brine hopper positioned in side-by-side relation relative to the salt hopper, a filter providing fluid communication between the salt hopper and the brine hopper, a generally horizontal auger positioned in a base of the salt hopper, a damper positioned in the salt hopper above the horizontal auger for selectively metering material from the salt hopper to the horizontal auger, an upwardly directed lift auger having a first end in operable association with an end of the horizontal auger and a second discharge end positioned above a level of brine in the brine hopper, and a controller operable to control opening and closing of the damper. The augers convey solid material from the base of the salt hopper and discharge the material from the machine.

The brine machine can have a first upper damper and a second lower damper, with the controller being operable to open and close the first damper and then open and close the second damper. The brine machine can have a first water spray bar in the salt hopper positioned adjacent an inlet side of the filter for flushing the inlet side of the filter, a second rotatable water spray bar in the brine hopper positioned adjacent an outlet side of the filter for flushing the outlet side of the filter, and a third rotatable water spray bar in the salt hopper positioned above the first damper for dissolving undissolved salt and sweeping material into the first damper, with the controller being operable to control rotation of the second and third rotatable water spray bars. The brine machine can have a grate positioned above the first damper and below the third rotatable water spray bar. The brine machine can have a fourth water spray bar positioned above the second damper for dissolving undissolved salt and sweeping material into the second damper. The filter can be a multi-stage filter, for example a three-stage filter of the type described above. The brine machine can have a first upper three-stage filter and a second lower three-stage filter, with each three-stage filter having a respective first water spray bar in the salt hopper positioned adjacent the inlet side of the filter for flushing the inlet side of the filter, and a respective second rotatable water spray bar in the brine hopper positioned adjacent the outlet side of the filter for flushing the outlet side of the filter.

In yet another aspect, a brine machine comprises a salt hopper, a source of water for wetting salt in the salt hopper, a brine hopper positioned in side-by-side relation relative to the salt hopper, the salt hopper and brine hopper in fluid communication having a fluid inlet on a salt hopper side and a fluid outlet on a brine hopper side, a generally horizontal auger positioned in a base of the salt hopper, and an upwardly directed lift auger having a first end in operable association with an end of the horizontal auger and a second discharge end positioned above a level of brine in the brine hopper. The augers convey solid material from the base of the salt hopper and discharge the material from the machine.

In yet another aspect, a brine machine comprises a salt hopper, a source of water for wetting salt in the salt hopper, a brine hopper positioned in side-by-side relation relative to the salt hopper, the salt hopper and brine hopper in fluid communication having a fluid inlet on a salt hopper side and a fluid outlet on a brine hopper side, a generally horizontal auger positioned in a base of the salt hopper, a damper positioned in the salt hopper above the horizontal auger for selectively metering material from the salt hopper to the horizontal auger, an upwardly directed lift auger having a first end in operable association with an end of the horizontal auger and a second discharge end positioned above a level of brine in the brine hopper, and a controller operable to control opening and closing of the damper. The augers convey solid material from the base of the salt hopper and discharge the material from the machine.

In yet another aspect, a method of producing brine comprises wetting salt in a salt hopper with water to form unfiltered brine, filtering the unfiltered brine with a filter as it moves from the salt hopper to a filtered brine hopper, opening a damper to allow filtered material to drop onto a horizontal auger, closing the damper, conveying the filtered material with the horizontal auger to an upstanding auger, conveying the filtered material with the upstanding auger, and discharging the filtered material from an upper end of the upstanding auger.

The method can further comprise rinsing an inlet side and an outlet side of the filter with water spray. The method can further comprise sweeping the filtered material into the damper with water spray.

In yet another aspect, a method of producing brine comprises wetting salt in a salt hopper with water to form unfiltered brine, filtering the unfiltered brine with a filter as it moves from the salt hopper to a filtered brine hopper, opening an upper damper to allow filtered material to drop onto a lower damper, closing the upper damper, opening the lower damper to allow filtered material to drop onto a horizontal auger, closing the lower damper, conveying the filtered material with the horizontal auger to an upstanding auger, conveying the filtered material with the upstanding auger, and discharging the filtered material from an upper end of the upstanding auger.

The method can further comprise rinsing an inlet side and an outlet side of the filter with water spray. The method can further comprise sweeping the filtered material into the upper damper with water spray. The method can further comprise sweeping the filtered material into the lower damper with water spray.

The accompanying drawings, which are incorporated in and constitute a part of this specification, illustrate embodiments of the invention and, together with the summary of the invention given above, and the detailed description of the drawings given below, serve to explain the principles of the present invention.

DETAILED DESCRIPTION OF THE DRAWINGS

Figure 1:
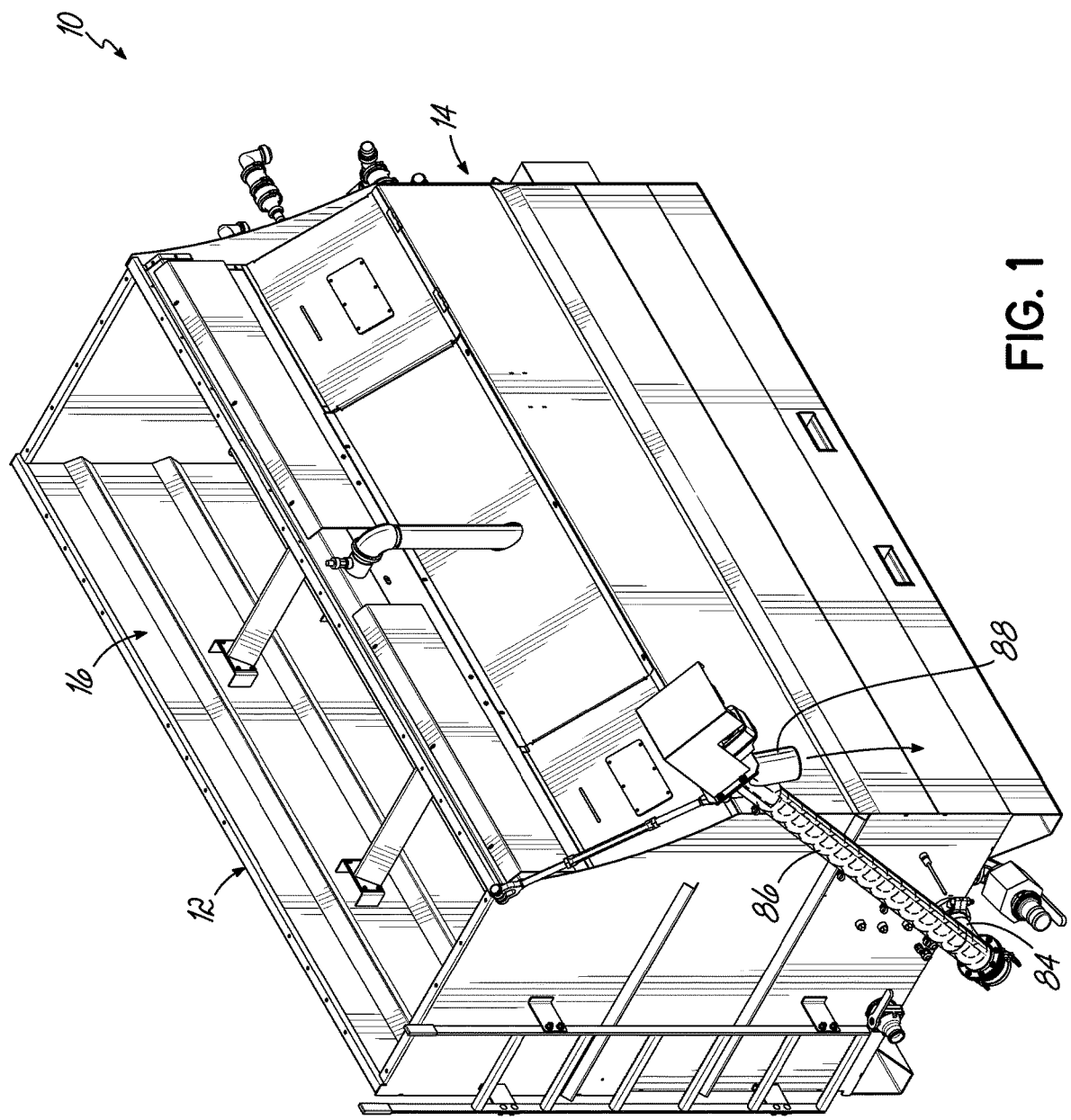
FIG. 1 is a left, front, top perspective view of a brine machine embodying the principles of the present invention.
Figure 2:
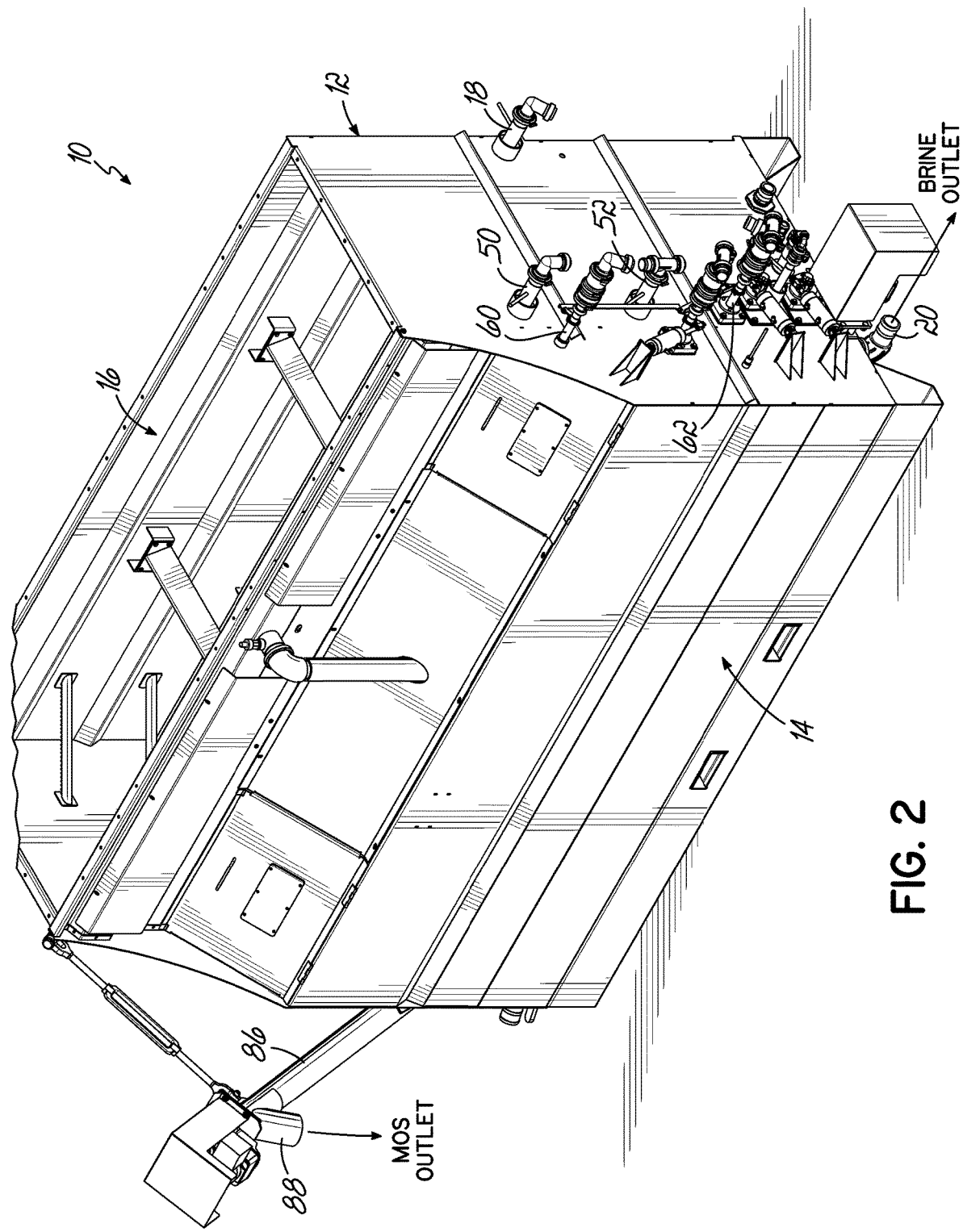
FIG. 2 is a right, front, top perspective view of the brine machine of FIG. 1.

Referring first to FIGS. 1 and 2, there is illustrated a brine machine 10 embodying the principles of the present invention. The brine machine 10 includes a salt hopper/unfiltered brine hopper 12 and a filtered brine hopper or tank 14 positioned in side-by-side relation relative to the salt hopper 12 (as opposed to below the salt hopper as in another type of brine machine). Salt is supplied to the salt hopper 12 through an upper opening 16. Water is supplied to the salt in the salt hopper via a water spray bar 18 to dissolve the salt into a brine solution. Filtered brine passes out of the filtered brine hopper 14 through a lower outlet 20.

Referring to FIGS. 3-7, unfiltered brine passes from the salt hopper/unfiltered brine hopper 12 through an upper multi-stage filter 30 and preferably, but not necessarily, a lower multi-stage filter 32 and into the filtered brine hopper 14. By way of example, the multi-stage filters 30, 32 are three-stage filters. By way of example, each three-stage filter 30, 32 has a first stage filter element or screen 40 having ³⁄₁₆ inch diameter circular openings, a second stage filter element or screen 42 having ⅛ inch wide by 1 inch long obround openings and that is horizontally spaced from the first stage filter element or screen 40, and a third stage filter element or screen 44 having number 50 mesh size openings and that is horizontally spaced from the second stage filter element or screen 42. More or less than three stages can be used for the filters 30, 32, and different sized openings can be used for the filter elements, depending on the MOS content of the salt supplied to the machine 10. The filter elements or screens 40, 42 are generally planar and are oriented such that their planes are generally vertical. Filter element or screen 44 includes first and second generally planar portions, the first planar portion being oriented such that its plane is generally vertical and the second planar portion being oriented at an angle relative to the first planar portion of between about 90 degrees and about 180 degrees. MOS and/or undissolved salt can drop downwardly off of the filter surfaces of the filter elements or screens 40, 42, 44 and out of the filters 30, 32 due to the spaced apart nature of the filter elements or screens 40, 42, 44.

The upper filter 30 has a water spray bar 50 located above it in the salt hopper 12. The water spray bar 50 is used to flush undissolved salt particles and/or MOS off of the first stage filter element 40 of the upper filter 30. Similarly, the lower filter 32 has a water spray bar 52 located above it in the salt hopper 12. The water spray bar 52 is used to flush undissolved salt particles and/or MOS off of the first stage filter element 40 of the lower filter 32.

The upper filter 30 also has a rotatable water spray bar 60 located above it in the brine hopper 14. The water spray bar 60 is used to flush (or back flush) undissolved salt particles and/or MOS off of the third stage filter element 44 of the upper filter 30. Similarly, the lower filter 32 has a rotatable water spray bar 62 located above it in the brine hopper 14. The water spray bar 62 is used to flush (or back flush) undissolved salt particles and/or MOS off of the third stage filter element 44 of the lower filter 32.

Figure 3:
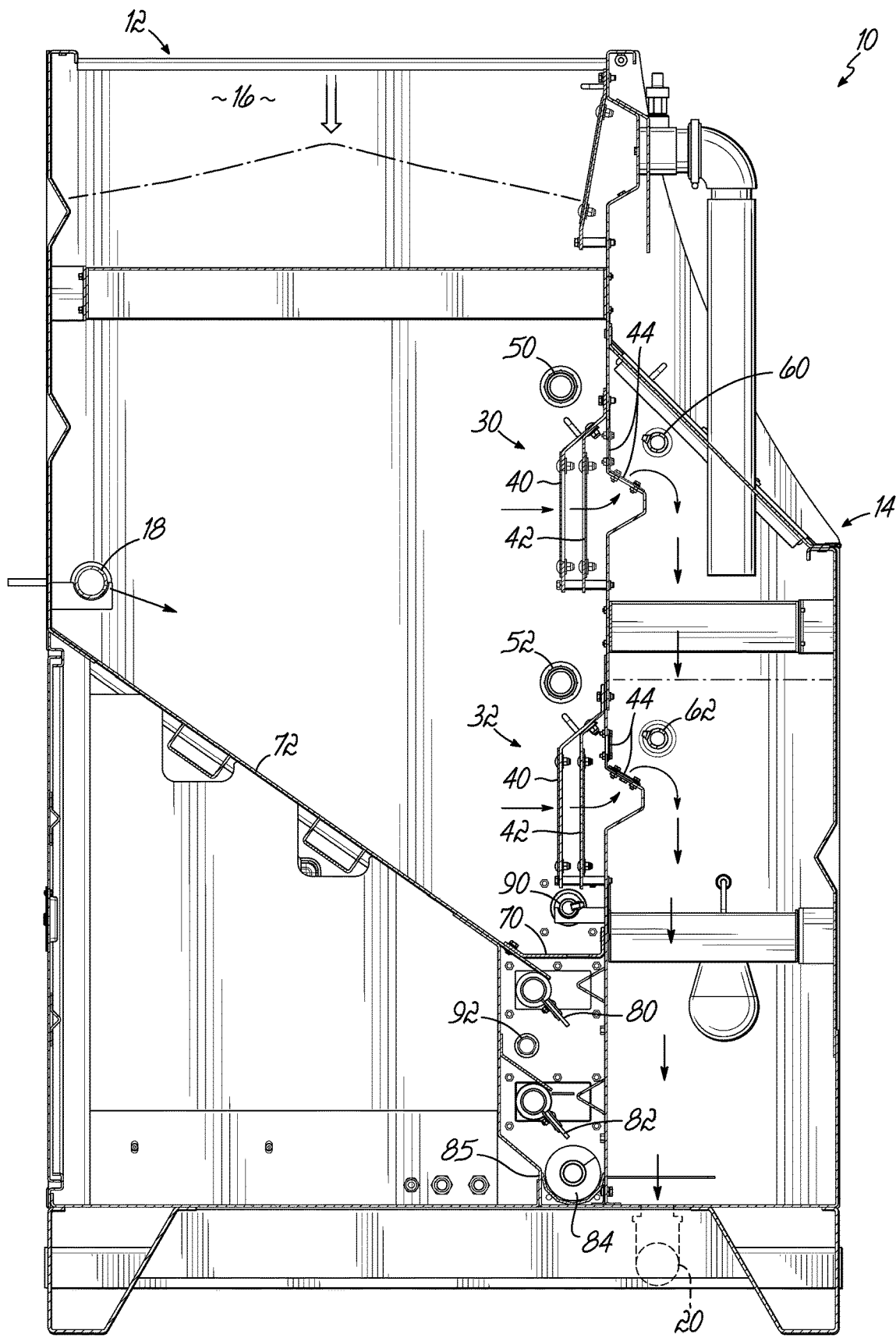
FIG. 3 is a side cross-sectional view of the brine machine of FIGS. 1 and 2 showing unfiltered brine in the salt hopper passing through the filters to enter the brine hopper as filtered brine.
Figure 3A:
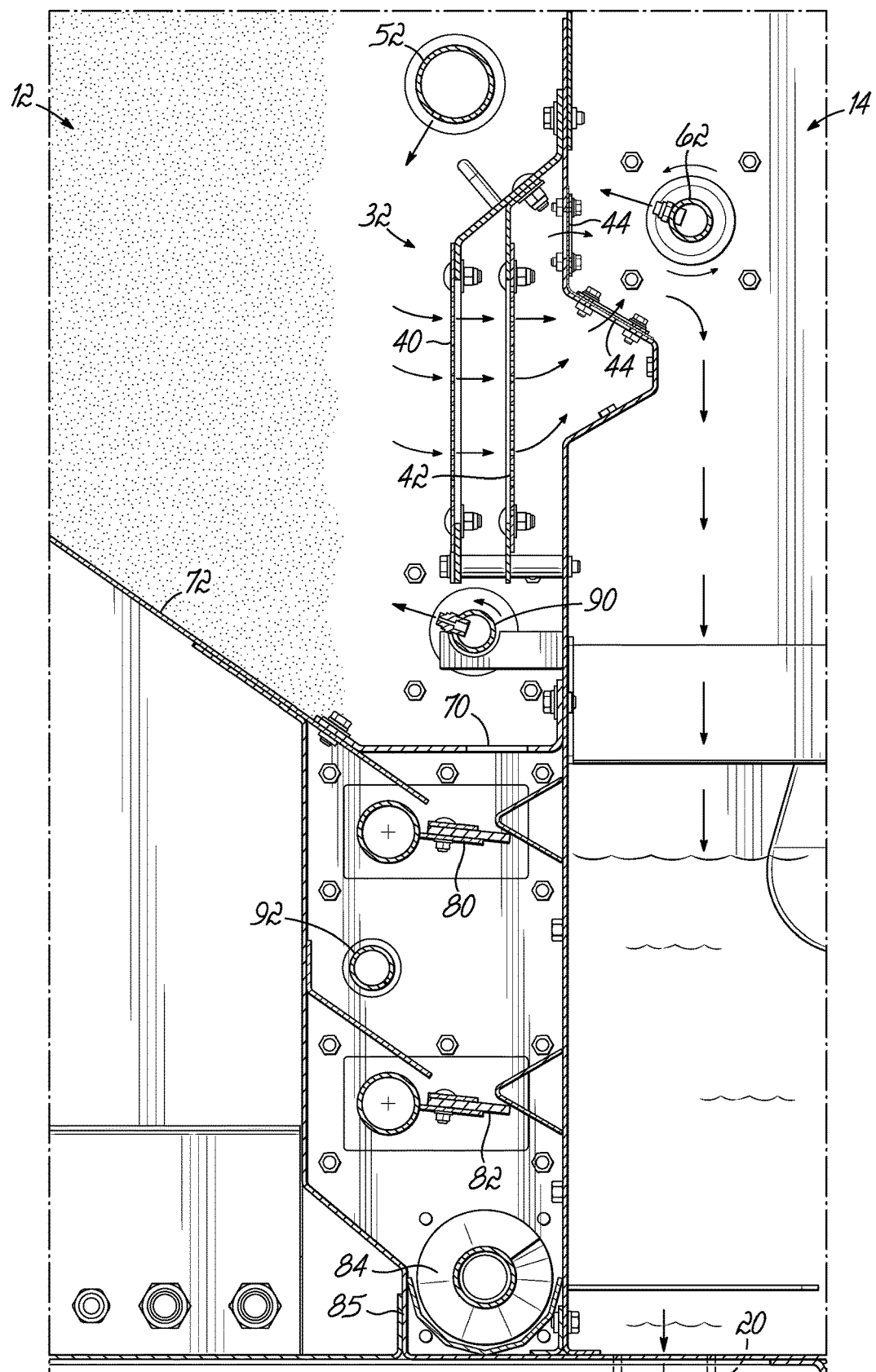
FIG. 3A is an enlarged side cross-sectional view showing the upper and lower dampers and the lower filter and showing unfiltered brine in the salt hopper passing through the filter to enter the brine hopper as filtered brine.
Figure 3B:
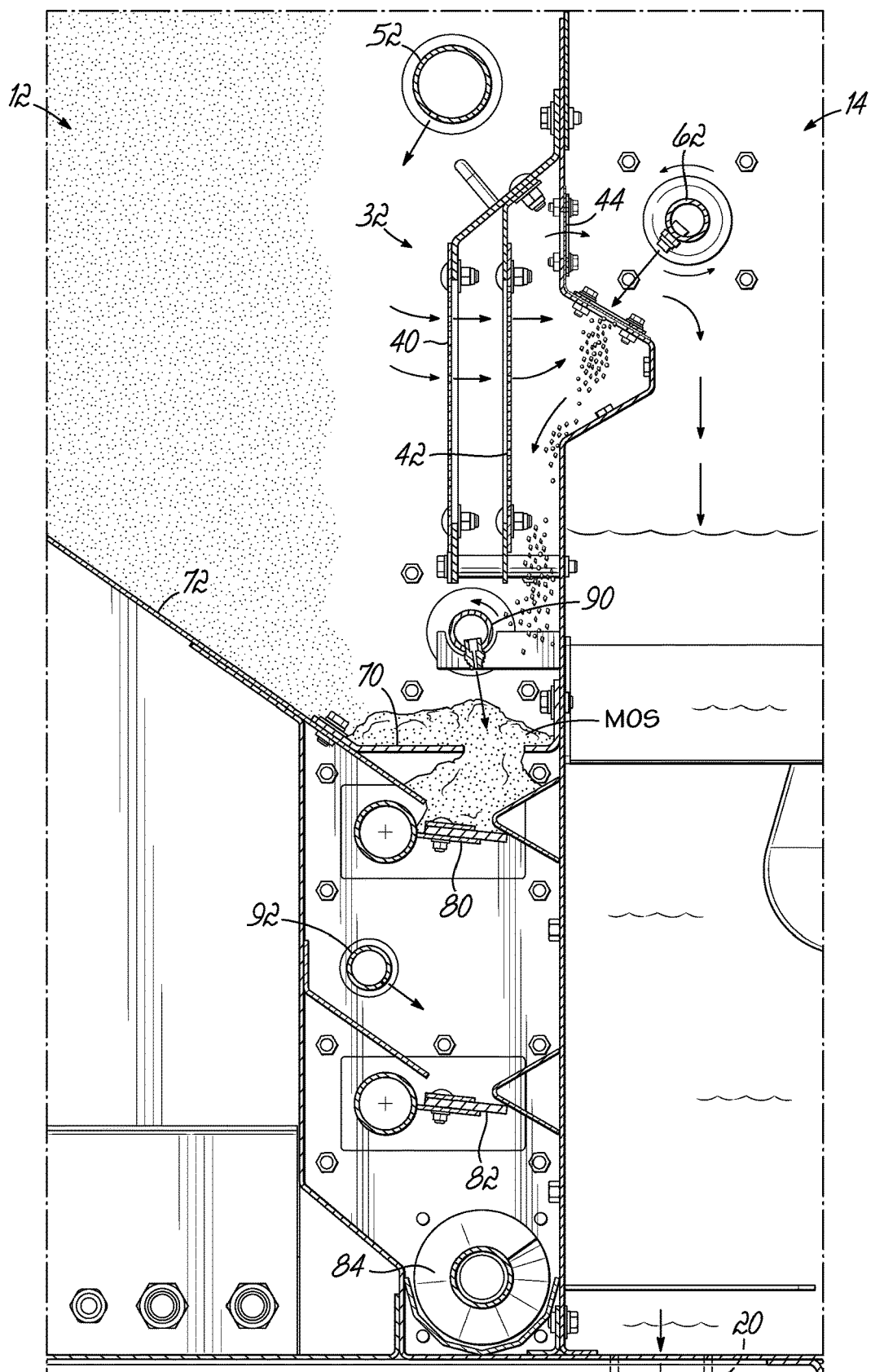
FIG. 3B is a view similar to FIG. 3A showing solid material being filtered by the filter, the inlet side of the filter being flushed by a water spray bar in the salt hopper, the outlet side of the filter being back flushed by a rotating water spray bar in the brine hopper, and the material dropping down onto the closed upper damper.

Salt particles and/or MOS too large to pass through all three stages of the filters 30, 32 drop out of the bottom of the filters 30, 32 and down onto a grate 70. See FIG. 3B. Grate 70 has 1.875 inch diameter by 2.813 inch long obround openings. Grate 70 is positioned along the lower edge of a slanted floor 72 of the salt hopper 12. Salt and/or unfiltered brine is thus directed by gravity onto grate 70. Below grate 70 is an openable and closable upper damper 80 and, preferably but not necessarily, an openable and closable lower damper 82. Below lower damper 82 is a generally horizontally oriented auger 84 positioned in a base or sump or lower channel 85 of salt hopper 12. One end of horizontal auger 84 is operably associated with a lower end of an upwardly directed lift auger 86 (FIGS. 1 and 2). Auger 86 has an upper discharge end 88 that is positioned above a level of brine in the brine hopper 14. The augers 84, 86 convey the MOS from the base of the salt hopper 12 and discharge the material from the machine 10.

The upper damper 80 has a rotatable water spray bar 90 located above it in the salt hopper 12. The water spray bar 90 dissolves undissolved salt on the grate 70 and sweeps material through the grate and into the upper damper 80.

The lower damper 82 has a water spray bar 92 located above it in the salt hopper 12. The water spray bar 92 dissolves undissolved salt and sweeps material into the lower damper 82.

Figure 8:
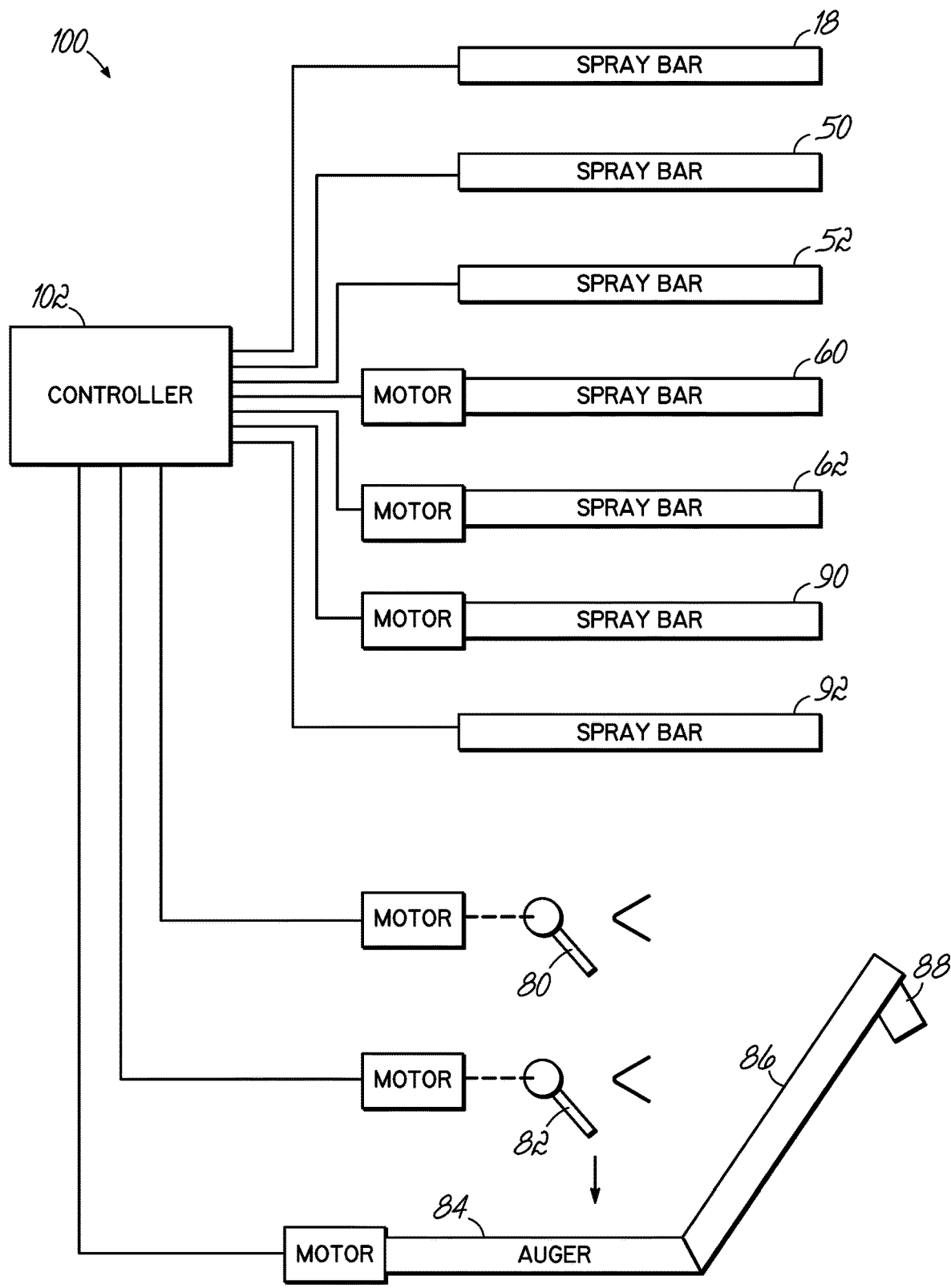
FIG. 8 is a block diagram of a control system for the brine machine.

Referring to FIG. 8, a control system 100 includes a controller 102 operably associated with water spray bars 18, 50, 52, 60, 62, 90, and 92, with upper damper 80, with lower damper 82, with horizontal auger 84, and with lift auger 86, via respective pumps, rotary motors, etc. known to those skilled in the art. Thus, the controller 102 controls water output through the water spray bars 18, 50, 52, 60, 62, 90, and 92, controls rotation of water spray bars 60, 62, and 90, controls opening and closing of dampers 80, 82, and controls rotation of augers 84, 86.

Figure 3C:
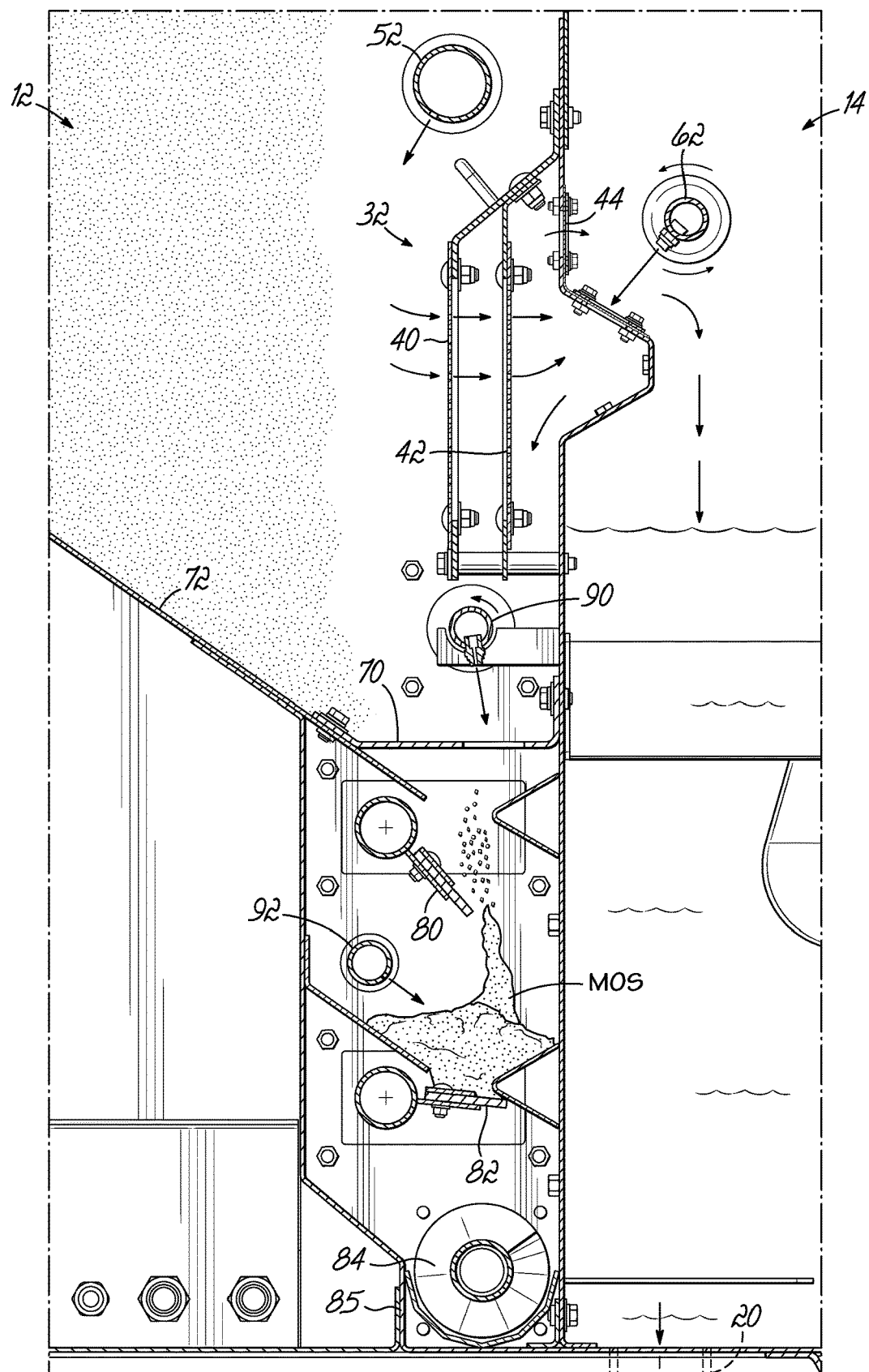
FIG. 3C is a view similar to FIG. 3B but showing the upper damper opened and the material being swept down onto the closed lower damper by a rotating water spray bar in the salt hopper.
Figure 3D:
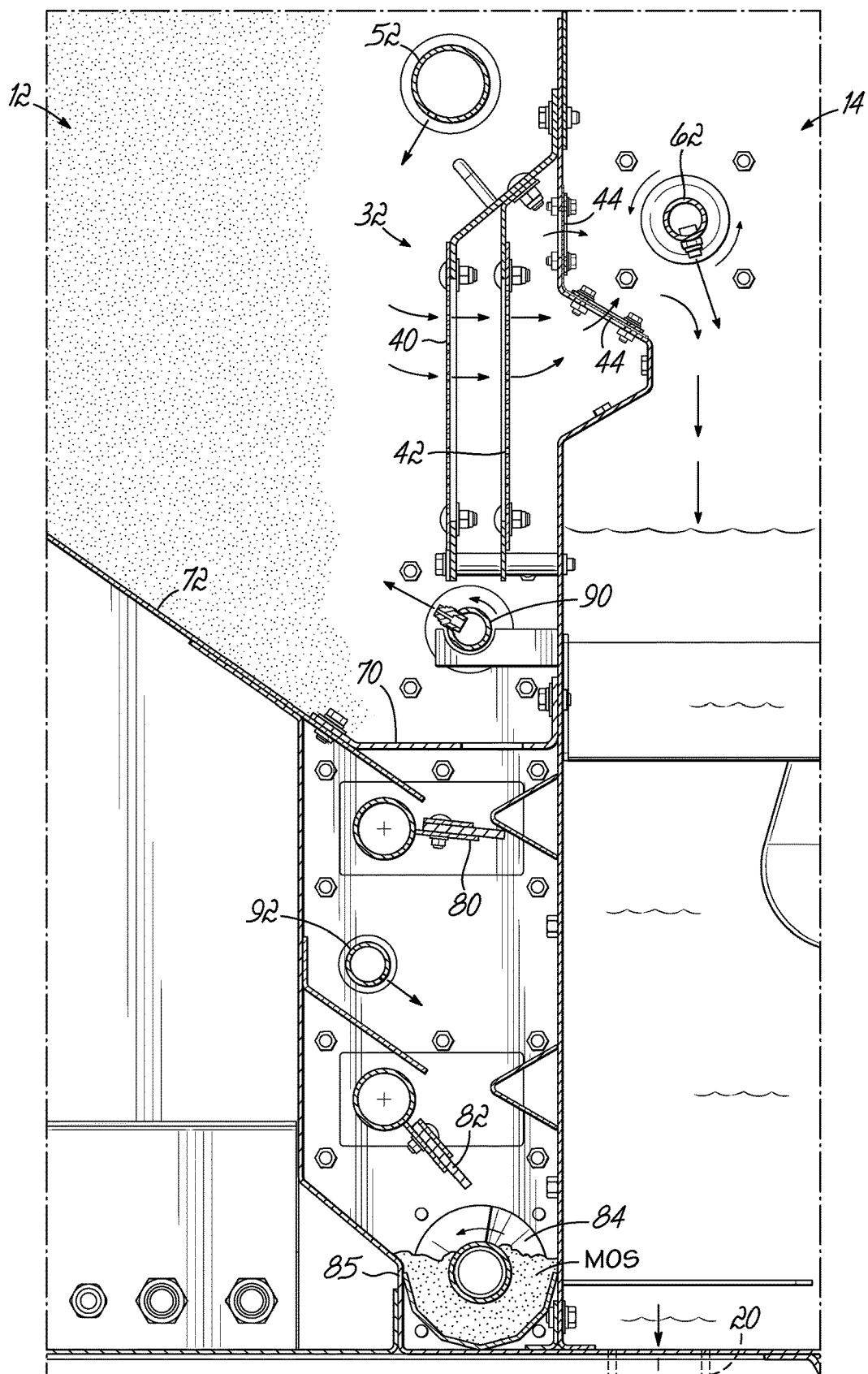
FIG. 3D is a view similar to FIG. 3C but showing the upper damper closed and the lower damper opened and the material being swept down onto the horizontal auger by a water spray bar.
Figure 4:
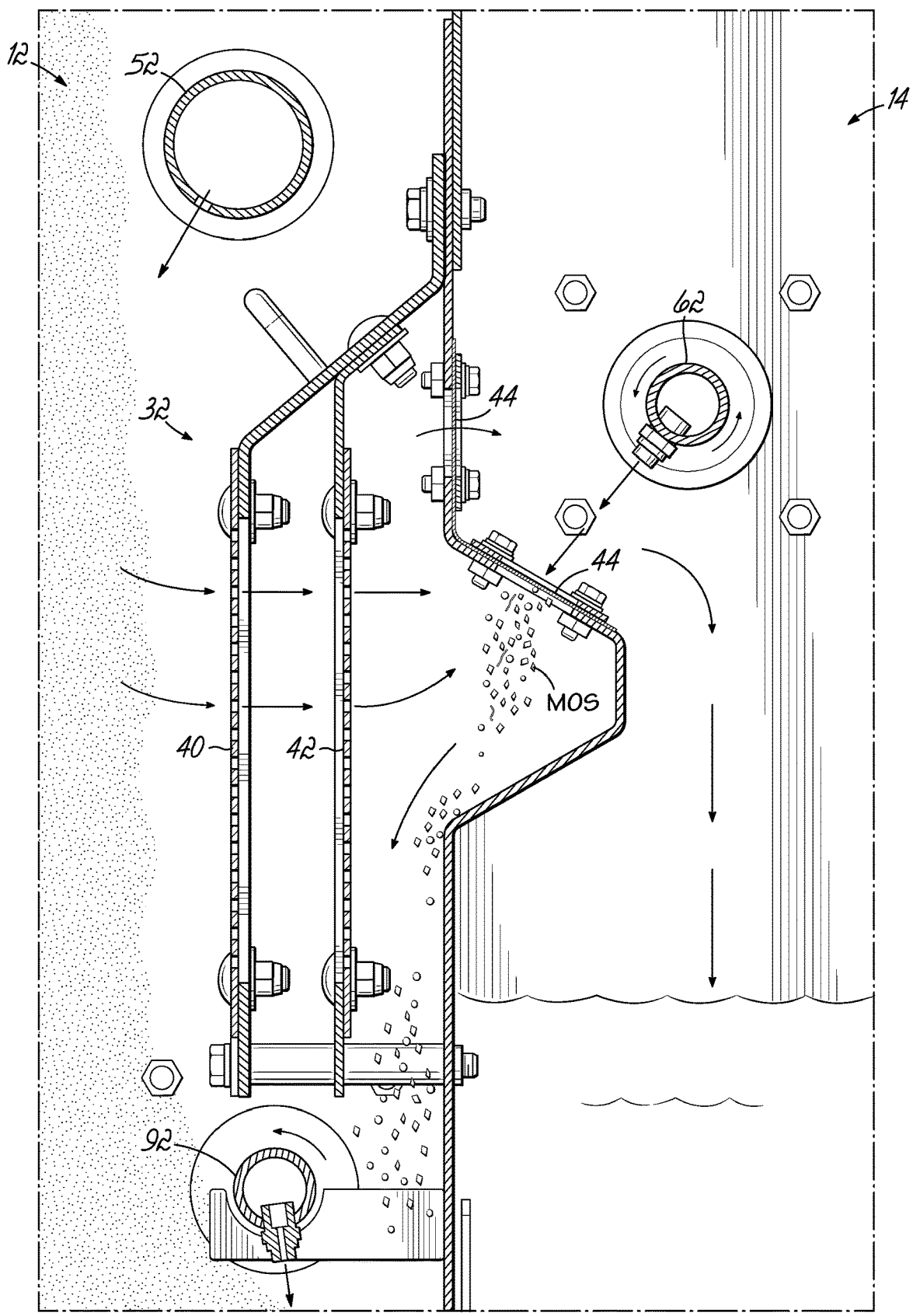
FIG. 4 is an enlarged side cross-sectional view showing one of the filters.
Figure 5:
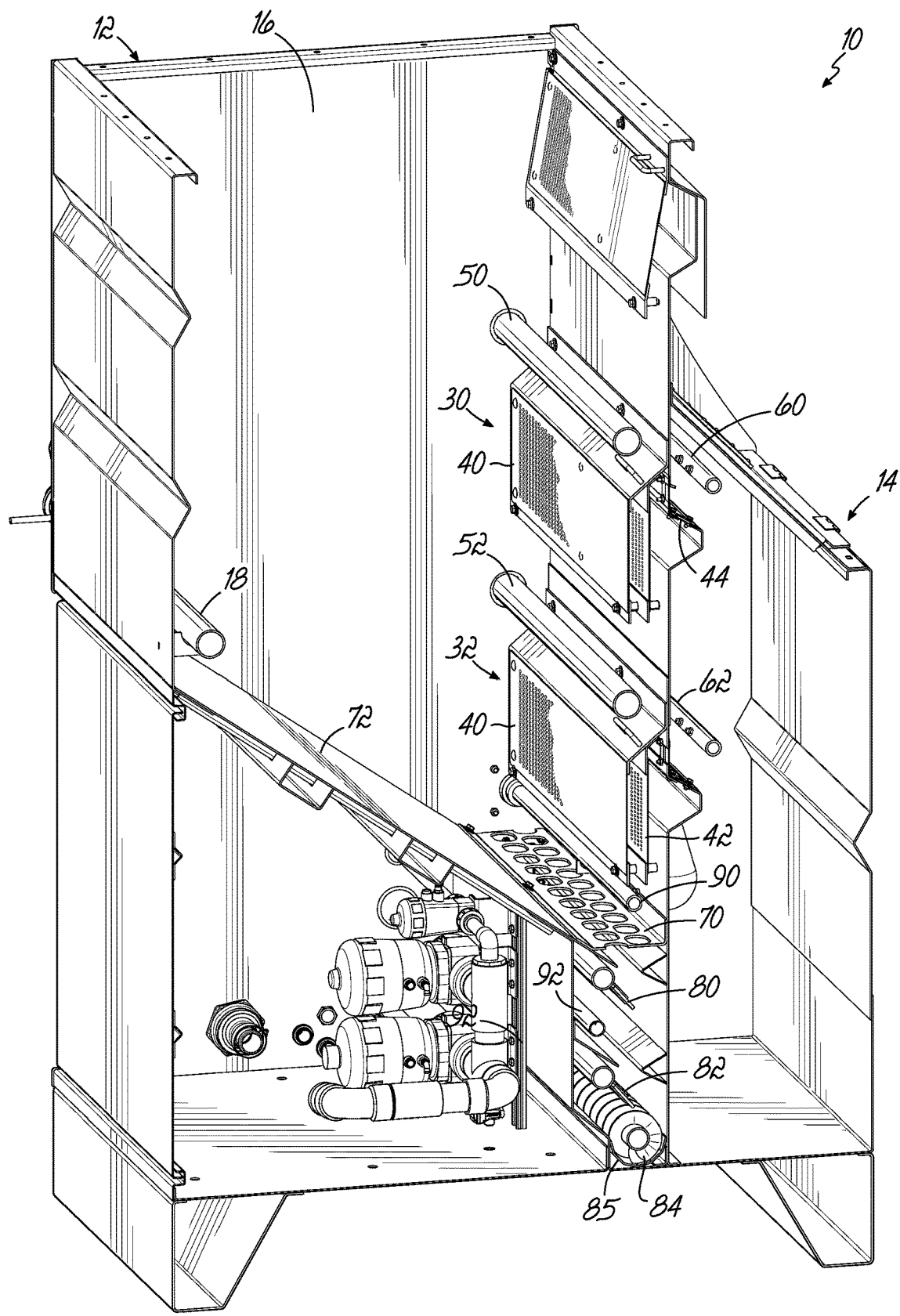
FIGS. 5-7 are cross-sectional views similar to FIG. 3 but from various perspectives.
Figure 6:
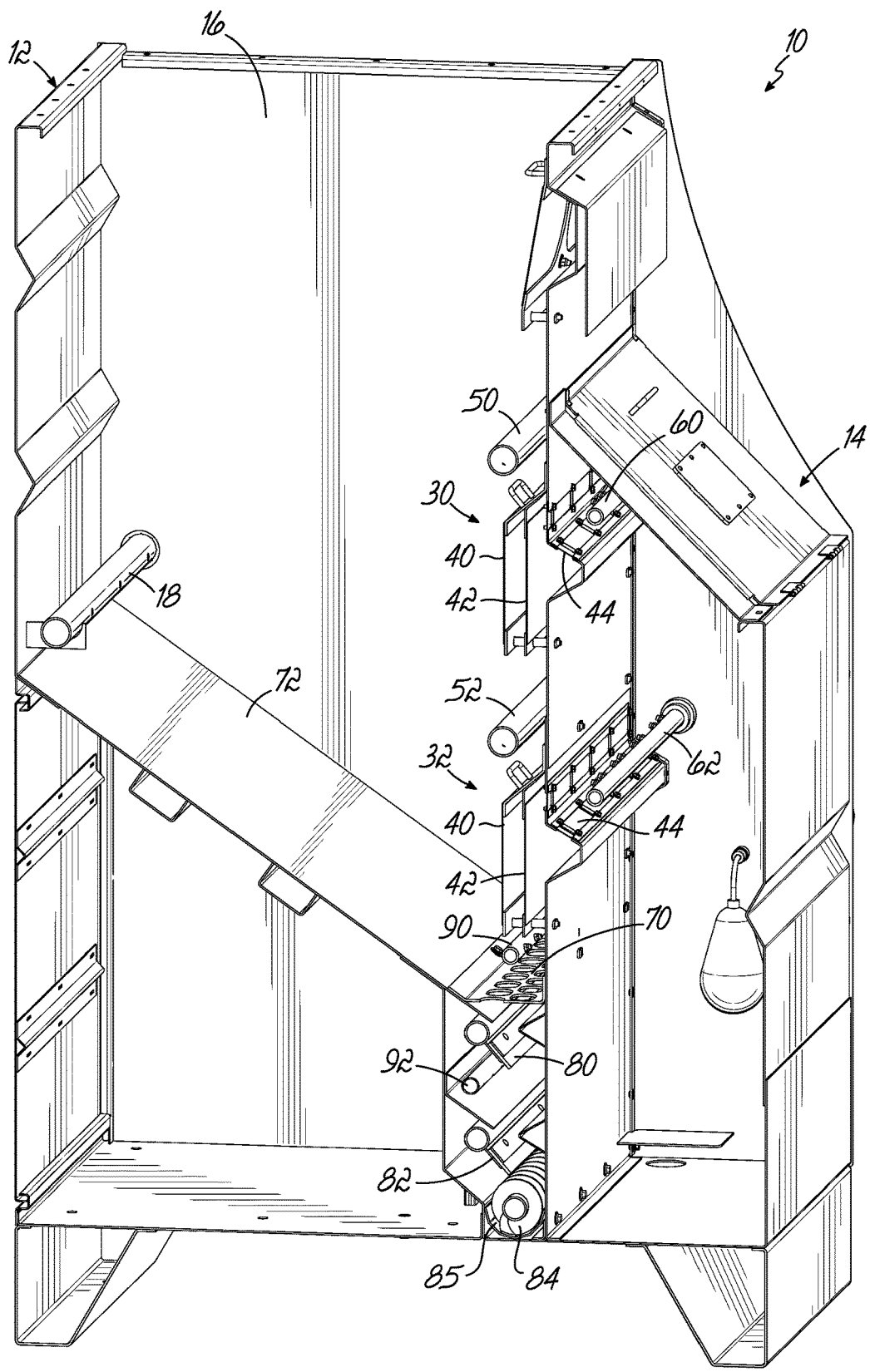
Figure 7:
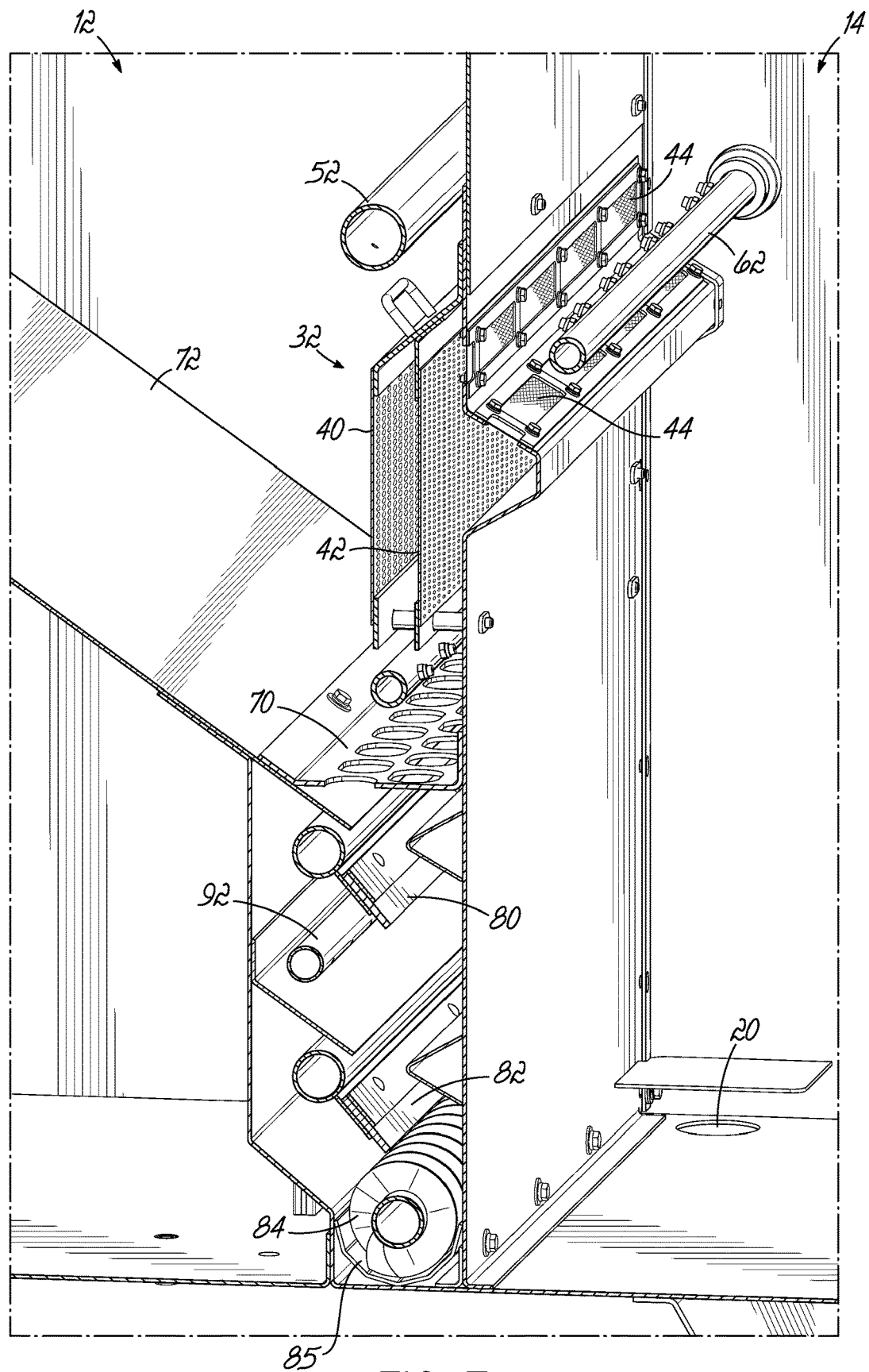

The controller 102 causes the augers 84, 86 to rotate continuously or periodically. The controller 102 periodically opens the upper damper 80 allowing MOS to drop down onto lower damper 82. See FIGS. 3B and 3C. The controller 102 then closes the upper damper 80 and opens the lower damper 82 allowing MOS to drop down onto horizontal auger 84. See FIG. 3D. The controller 102 then closes the lower damper 82 in preparation for the next self-cleaning cycle. The auger 84 conveys the MOS out of the salt hopper 12 to the lift auger 86. The lift auger 86 conveys the MOS upwardly where it drops out of discharge end 88 of auger 86. Since the discharge end 88 of auger 86 is above the brine level in the brine hopper 14, no brine escapes out.

The time intervals between opening dampers 80, 82, the time duration each damper 80, 82 is open, the amount and timing of water supplied via the water spray bars 18, 50, 52, 60, 62, 90, and 92, and the time intervals between rotating the water spray bars 60, 62, and 90 and the time duration each water spray bar 60, 62, 90 is rotated vary depending on the desired rate at which brine is being made, the MOS in the salt supplied to the machine 10, and the desired salinity.

By continuously supplying salt and water to the machine 10, continuously or periodically running the augers 84, 86, continuously filtering the brine with filters 30, 32, periodically opening and closing upper damper 80 then opening and closing lower damper 82, and periodically rotating water spray bars 60, 62, and 90, the brine machine 10 can continuously produce brine in a continuously self-cleaning fashion, without the need to be shut down to clear the machine 10 of MOS.

The present invention can be incorporated into either of the two types of brine systems. In one type of system, a flow through system, the salinity of the mixture is controlled by the addition of salt or water to the mixing tank until the correct salinity is reached. In the other type of system, a re-circulation system, the brine mixture is re-circulated back through the salt until the proper salinity is reached. Once the proper salinity is reached in either system, the brine can be pumped to a storage tank.

The assignee's US Patent Publication No. 2014/0251177, US Patent Publication No. 2013/0099155, and U.S. Pat. No. 9,890,310 are all hereby incorporated by reference herein as if fully set forth in their entireties, and may be consulted for additional details of brine systems that can be incorporated into the brine machine of the present invention.

The various embodiments of the invention shown and described are merely for illustrative purposes only, as the drawings and the description are not intended to restrict or limit in any way the scope of the claims. Those skilled in the art will appreciate various changes, modifications, and improvements which can be made to the invention without departing from the spirit or scope thereof. The invention in its broader aspects is therefore not limited to the specific details and representative apparatus and methods shown and described. Departures may therefore be made from such details without departing from the spirit or scope of the general inventive concept. The invention resides in each individual feature described herein, alone, and in all combinations of any and all of those features. Accordingly, the scope of the invention shall be limited only by the following claims and their equivalents.

What is claimed is:

1. A self-cleaning brine machine comprising:
    a salt hopper,
    a source of water for wetting salt in said salt hopper,
    a brine hopper positioned in side-by-side relation relative to said salt hopper,
    a filter providing fluid communication between said salt hopper and said brine hopper,
    a first water sprayer in said salt hopper positioned adjacent an inlet side of said filter for flushing said inlet side of said filter,
    a second water sprayer in said brine hopper positioned adjacent an outlet side of said filter for flushing said outlet side of said filter,
    a generally horizontal auger positioned in a base of said salt hopper,
    a first upper damper and a second lower damper both positioned in said salt hopper above said horizontal auger, said first upper damper for selectively metering solid waste material from said salt hopper to said second lower damper, said second lower damper for selectively metering the solid waste material to said horizontal auger,
    a third water sprayer in said salt hopper positioned above said first upper damper for dissolving undissolved salt and sweeping the solid waste material into said first upper damper,
    a fourth water sprayer in said salt hopper positioned above said second lower damper for dissolving undissolved salt and sweeping the solid waste material into said second lower damper,
    an upwardly directed lift auger having a first end in operable association with an end of said horizontal auger and a second discharge end positioned above a level of brine in said brine hopper, and
    a controller operable to control said water sprayers, said dampers, and said augers, including being operable to open and close said first upper damper and then open and close said second lower damper sequentially,
    said augers for conveying the solid waste material from said base of said salt hopper and discharging the solid waste material from said machine continuously during operation of said machine.

2. A method of continuously producing brine in a self-cleaning fashion comprising:
    wetting salt in a salt hopper with water to form unfiltered brine,
    filtering the unfiltered brine with a filter as it moves from the salt hopper to a filtered brine hopper to separate out solid waste material therefrom,
    flushing an inlet side of the filter with water,
    flushing an outlet side of the filter with water,
    opening an upper damper to allow the solid waste material to drop onto a lower damper,
    dissolving undissolved salt and sweeping the solid waste material into the upper damper with water,
    closing the upper damper,
    opening a lower damper to allow the solid waste material to drop onto a horizontal auger,
    dissolving undissolved salt and sweeping the solid waste material into the lower damper with water,
    closing the lower damper,
    conveying the solid waste material with the horizontal auger to an upstanding auger having an upper discharge end positioned above a level of brine in the brine hopper,
    conveying the solid waste material with the upstanding auger,
    discharging the solid waste material from the upper end of the upstanding auger, and
    controlling the flushing, dissolving, and sweeping water, the dampers, and the augers with a controller.

* * * * *